United States Patent
Freese et al.

(10) Patent No.: US 10,500,926 B2
(45) Date of Patent: Dec. 10, 2019

(54) VENTILATION DUCT FOR VENTILATING A PASSENGER INTERIOR OF A MOTOR VEHICLE

(71) Applicant: Dr. Ing. h.c. F. Porsche Aktiengesellschaft, Stuttgart (DE)

(72) Inventors: Bastian Freese, Stuttgart (DE); Robert Fleischhacker, Tiefenbronn-Muehlhausen (DE); Finn Oertzen, Munich (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 15/176,220

(22) Filed: Jun. 8, 2016

(65) Prior Publication Data

US 2016/0361977 A1    Dec. 15, 2016

(30) Foreign Application Priority Data

Jun. 9, 2015  (DE) .......... 10 2015 109 069

(51) Int. Cl.
  *B60H 1/34*   (2006.01)
  *B60H 1/00*   (2006.01)

(52) U.S. Cl.
  CPC ....... *B60H 1/3414* (2013.01); *B60H 1/00678* (2013.01); *B60H 1/00564* (2013.01); *B60H 2001/00721* (2013.01); *F24F 2221/28* (2013.01)

(58) Field of Classification Search
  CPC .............. B60H 1/3414; B60H 1/00678; B60H 1/00564; F24F 2221/28
  (Continued)

(56) References Cited

U.S. PATENT DOCUMENTS 4,595,051 A   6/1986   Cadars et al.
7,823,798 B2  11/2010  Le Lievre
(Continued)

FOREIGN PATENT DOCUMENTS

DE   971 025      7/1949
DE   34 17 370    11/1984
(Continued)

OTHER PUBLICATIONS

English translation of the Abstract of document FR2772311A1.*
Japanese Office Action dated May 10, 2017.
German Examination Report dated Feb. 27, 2019.

*Primary Examiner* — Helena Kosanovic
(74) *Attorney, Agent, or Firm* — Gerald E. Hespos; Michael J. Porco; Matthew T. Hespos

(57) ABSTRACT

A ventilation duct (10) for a passenger interior of a motor vehicle has an inflow duct (12) for supplying air and a main guiding duct (14) that extends from the inflow duct (12) to an outlet opening (16) for guiding at least part of the air of the inflow duct (12) along a main flow direction (28) toward the outlet opening (16). At least one bypass duct (18, 40) can branch from the inflow duct (12) for discharging part of the air of the inflow duct (12). The bypass duct (18, 40) opens into the main guiding duct (14) upstream of the outlet opening (16) and introduces a flow jet (32) into the main guiding duct (14) at an angle to the main flow direction (28) for setting the flow direction of air at the outlet opening (16) without openings or louver grilles that are visible from the passenger interior.

10 Claims, 5 Drawing Sheets

(58) Field of Classification Search
USPC .......................................................... 454/152
See application file for complete search history.

(56) References Cited

U.S. PATENT DOCUMENTS

| | | |
|---|---|---|
| 2005/0183855 A1 | 8/2005 | Izawa |
| 2005/0279843 A1* | 12/2005 | Dieksander ........ B60H 1/00028 236/49.3 |
| 2008/0011866 A1* | 1/2008 | Le Lievre ................ B60H 1/20 237/12.3 A |
| 2009/0014593 A1* | 1/2009 | Westenberger ......... B64C 21/08 244/209 |
| 2009/0215379 A1 | 8/2009 | Matsunoo |
| 2011/0151763 A1* | 6/2011 | Selchert ................. B64D 13/00 454/76 |
| 2016/0039389 A1 | 2/2016 | Kato et al. |

FOREIGN PATENT DOCUMENTS

| | | | |
|---|---|---|---|
| DE | 10 2006 017 376 | 10/2007 | |
| FR | 2772311 A1 * | 6/1999 | ........... B60H 1/3414 |
| JP | 1-148552 | 10/1989 | |
| JP | 3-73852 | 7/1991 | |
| JP | H0743145 A | 2/1995 | |
| JP | 2005-212746 | 8/2005 | |
| JP | 2011168140 A | 9/2011 | |
| JP | 2014237352 A | 12/2014 | |
| WO | 99/07569 | 2/1999 | |

\* cited by examiner

VENTILATION DUCT FOR VENTILATING A PASSENGER INTERIOR OF A MOTOR VEHICLE

CROSS REFERENCE TO RELATED APPLICATION

This application claims priority under 35 USC 119 to German Patent Appl. No. 10 2015 109 069.4 filed on Jun. 9, 2015, the entire disclosure of which is incorporated herein by reference.

BACKGROUND

1. Field of the Invention

The invention relates to a ventilation duct that can be used in an air conditioning system of a motor vehicle to ventilate a passenger interior of the motor vehicle with temperature-controlled air.

2. Description of the Related Art

JP 2005 212 746 A discloses an air conditioning system for a motor vehicle with pivotable louver grilles in a ventilation duct that leads to a passenger interior. An air flow that enters the passenger compartment at a very oblique angle due to a very pronounced angle of attack of the louver grilles can stick to the instrument panel. To prevent this, part of the air flow of the ventilation duct can be guided via a bypass duct to an additional opening in the instrument panel. The air that is branched off via the bypass duct exits perpendicularly with respect to the surface of the instrument panel and detaches the air flow from the instrument panel.

There is a constant need to design the passenger interior of a motor vehicle in a visually pleasing manner.

It is an object of the invention to provide a visually pleasing passenger interior with efficient air flow.

SUMMARY

A ventilation duct for ventilating a passenger interior of a motor vehicle includes an inflow duct for supplying air, a main guiding duct that extends from the inflow duct as far as an outlet opening for guiding at least part of the air of the inflow duct along a main flow direction toward the outlet opening, and at least one bypass duct that can branch off from the inflow duct for discharging part of the air of the inflow duct. The bypass duct opens into the main guiding duct at a spacing from the outlet opening. Additionally, the bypass duct is configured for introducing a flow jet into the main guiding duct. The flow jet is oriented at an angle to the main flow direction.

Part of the air of the inflow duct can be branched off via the bypass duct and can be fed to the main guiding duct at an angle to the main flow direction. As a result, the air flow of the bypass duct can exert an impetus and/or a flow impact on the flow in the main guiding duct. Thus, it is possible to allow the air of the main guiding duct to exit obliquely to a plane defined by the outlet opening rather than perpendicularly. The outlet direction of the flow of the ventilation duct from the outlet opening can be set as desired over a wide range, for example, by way of: the magnitude of the impetus that is imparted by the flow of the bypass duct, the orientation of the bypass duct, the number of bypass ducts and the selection of bypass ducts that are activated for branching off air of the inflow duct. This flow direction is made possible by the geometric configuration of the bypass duct. As a result, the flow direction of temperature-controlled air that flows into the passenger interior can be set without louver grilles. Thus, an impairment of the visual impression of the passenger interior as a result of louver grilles that are visible to vehicle occupants is avoided. At the same time, the opening of the bypass duct is effected at a spacing from the outlet opening within the ventilation duct in the region of the main guiding duct. As a result, an opening of the bypass duct into the main guiding duct is not visible or is at least visible only with difficulty for vehicle occupants. As a result, an impairment of the visual impression caused by plural openings in an instrument panel is avoided. The bypass duct is spaced from the outlet opening, but can set the flow direction of the air in the outlet opening without openings and/or louver grilles that are visible from the passenger interior. Therefore, a visually pleasing passenger interior is made possible with comfortable ventilation of the passenger interior.

The main flow direction corresponds to the flow direction of the air if only the inflow duct and the main guiding duct are present, with no further components. Without the bypass duct, the air would pass along the main flow direction and substantially perpendicularly through a plane defined by the outlet opening. The inflow duct is upstream of the bypass duct and the main guiding duct. The inflow duct extends in the flow direction beyond an inlet opening, via which the bypass duct communicates with the inflow duct. That boundary of the inlet opening lies downstream for the air that follows the main flow direction. As a result, the material of a duct wall of the ventilation duct defines a flow cross section with a plane that divides the ventilation duct outside the bypass duct theoretically into an inflow duct that lies upstream and a main guiding duct that lies downstream. A duct wall of the inflow duct preferably delimits an identical flow cross section as a duct wall of the main guiding duct. The main guiding duct opens at the outlet opening into the passenger interior of the motor vehicle. The flow jet from the bypass duct impinges on the air that flows in the main flow direction at an acute angle $\alpha$. For example, the angle $\alpha$ is $5° \leq \alpha \leq 50°$, in particular $10° \leq \alpha \leq 45°$, preferably $15° \leq \alpha \leq 30°$ and particularly preferably $20° \leq \alpha \leq 25°$. The flow jet is directed onto the outlet opening. More particularly, an imaginary downstream directed extension of the bypass duct would lead through the outlet opening at least to a large extent and would not end at a duct wall of the main guiding duct. As a result, the air flow of the main guiding duct can be pressed easily onto the material that forms the outlet opening so that a correspondingly more pronounced diversion of the air flow of the main guiding duct can be achieved, for example, by way of the Coanda effect. More than one bypass duct, for example two, four, six or eight bypass ducts, may be provided to divert the air flow of the main guiding duct into a correspondingly large number of different directions.

An end region of the main guiding duct that extends as far as the outlet opening may be rounded to generate a Coanda effect at least in a circumferential region opposite the bypass duct. As a result, the air flow of the main guiding duct that is diverted by the flow jet can bear easily against the rounded end region and can be diverted yet further by the Coanda effect. As a result, the flow direction of the flow that leaves the outlet opening can be varied to an even greater extent over an even broader range.

The bypass duct may be configured to be closed and/or opened by an inlet flap that points toward the inflow duct. The bypass duct can be activated with an open inlet flap or can be deactivated with a closed inlet flap depending on the desired flow direction of the flow that leaves the outlet opening. The inlet flap can assume a plurality of intermediate positions between the closed position and the open position to vary the volumetric flow that is introduced into the bypass duct and thus to set the extent of the diversion of the air flow of the main guiding duct by way of the flow jet of the bypass duct.

The inlet flap that is in the open position may protrude into the inflow duct to configure a funnel-shaped inflow region into the bypass duct. The funnel-shaped inflow region that is configured with the aid of the inlet flap can accelerate the volumetric flow that is branched off from the inflow duct into the bypass duct to create a more powerful flow jet with a correspondingly higher impetus. At the same time, the flow velocity of the air in the main guiding duct can be reduced somewhat as a result so that the flow of the main guiding duct can be diverted more easily by the flow jet of the bypass duct.

The end of the bypass duct that points toward the inflow duct may be funnel-shaped to accelerate the air that is branched off. The bypass duct can taper in a funnel-shaped manner downstream of the inlet opening that communicates with the inflow duct to accelerate the flow in the bypass duct and to achieve a more powerful flow jet with a correspondingly higher impetus. In addition or as an alternative, the bypass duct can taper in a funnel-shaped manner toward an outlet opening of the bypass duct that communicates downstream with the main guiding duct to form a nozzle and to achieve a more powerful flow jet with a correspondingly higher impetus.

At least one dividing wall may be provided in the main guiding duct for dividing the main guiding duct into at least two part ducts. A side of the dividing wall that points toward the inflow duct may have a guiding flap for setting different flow velocities in the part ducts. As a result, a higher volumetric flow can be provided, for example, in a radially outer part duct so that a correspondingly higher volumetric flow can be diverted merely by way of the Coanda effect, whereas merely a correspondingly smaller volumetric flow in a radially inner part duct needs to be diverted by the flow jet of the bypass duct. A funnel-shaped inflow region may be configured by the guiding flap. Thus, an accelerated flow that is subjected to the Coanda effect can be formed in a part duct that points away from the active bypass duct. This accelerated flow can possibly even form a flow jet that can be diverted particularly simply by way of the Coanda effect.

The bypass duct may be configured to be closed and/or opened by an outlet flap that points toward the main guiding duct. The outlet flap prevents an undesired return flow from the main guiding duct via the outlet opening of the bypass duct that communicates with the main guiding duct counter to the provided flow direction into the bypass duct, if the bypass duct is to be deactivated.

The outlet flap may close a radially outer part duct in the open position. The outlet flap is opened if the associated bypass duct is to be activated. A part duct that runs adjacent to the bypass duct can be closed when the outlet flap is open to avoid a Coanda effect of the flow that counteracts the flow diversion of the flow jet of the bypass duct via the part duct that flows to the activated bypass duct. The outlet flap is closed if the bypass duct is to be deactivated. Thus, the part duct that runs adjacent to the bypass duct that then is deactivated is opened again at the same time.

A first bypass duct may be provided for diverting the flow of the main guiding duct in a first direction, and a second bypass duct may be opposite the first bypass duct for diverting the flow of the main guiding duct in a second direction that is different from the first direction. Even more bypass ducts may be provided for diverting the flow of the main guiding duct in even more different directions. In each case two bypass ducts are arranged opposite one another in pairs so that the flow of the main guiding duct can be diverted in different directions.

The invention also relates to an air conditioning system for controlling the climate of a passenger interior of a motor vehicle. The air conditioning system may have the above-described ventilation duct to feed temperature-controlled air into the passenger interior. The flow direction of the air can be set in the outlet opening by the bypass duct that is spaced from the outlet opening and without openings and/or louver grilles that are visible from the passenger interior. As a result, a visually pleasing passenger interior is made possible with comfortable ventilation of the passenger interior.

The invention further relates to a motor vehicle having a passenger interior for accommodating a passenger, and the above described air conditioning system for controlling the climate of the passenger interior. The bypass duct of the ventilation duct of the air conditioning system is spaced from the outlet opening and enables the flow direction of the air to be set in the outlet opening without openings and/or louver grilles that are visible from the passenger interior. As a result, a visually pleasing passenger interior is made possible with comfortable ventilation of the passenger interior.

In the following text, the invention will be explained by way of example with reference to the appended drawings using preferred exemplary embodiments, it being possible for the features described herein to represent an aspect of the invention both individually and in combination.

DETAILED DESCRIPTION

Figure 1:
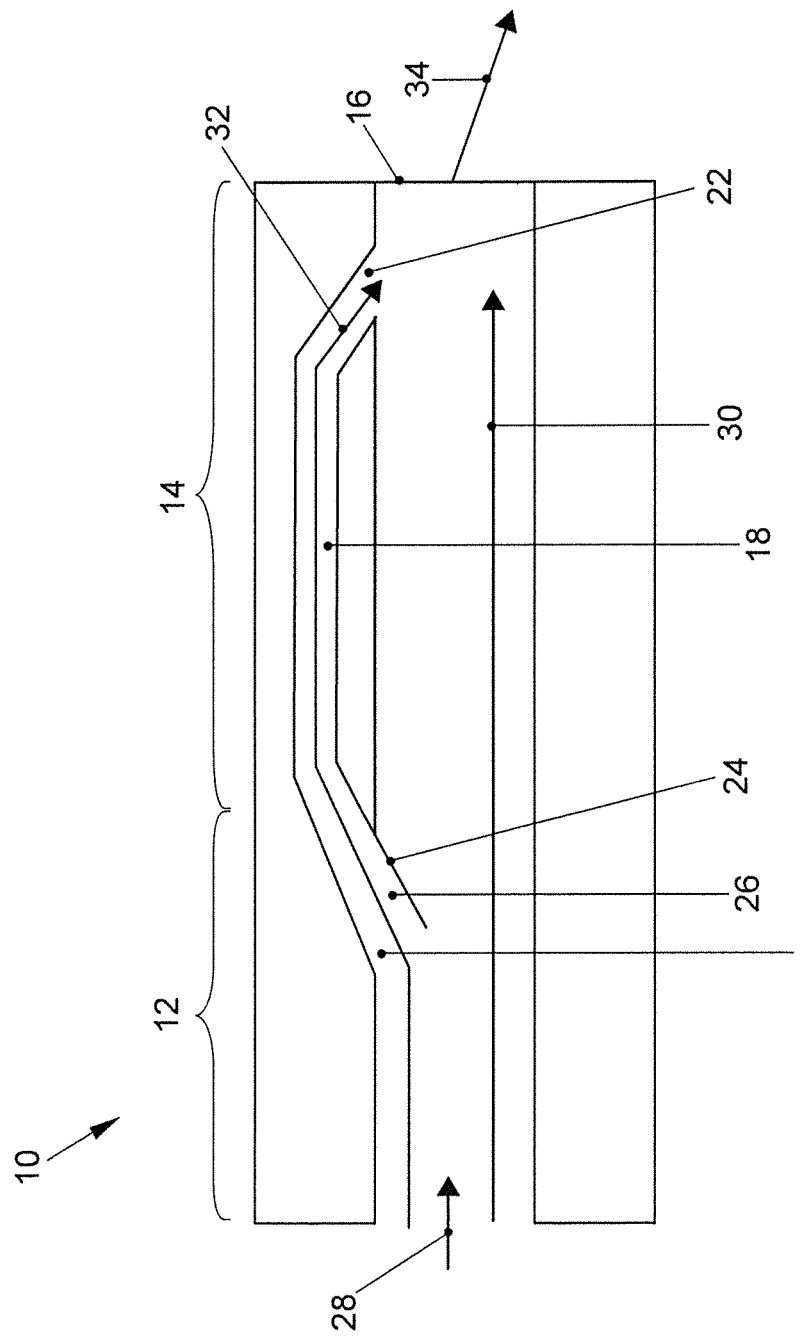
FIG. 1 is a diagrammatic sectional view of a first embodiment of a ventilation duct.

A ventilation duct 10 of an air conditioning system for a motor vehicle has an inflow duct 12 adjoined by a main guiding duct 14 that ends at an outlet opening 16, as shown in FIG. 1. A bypass duct 18 is connected via an inlet opening 20 to the inflow duct 12 and via an outlet opening 22 to the main guiding duct 14. The inlet opening 20 can be opened and closed by an inlet flap 24. Thus, a funnel-shaped inflow region 26 for the air of the inflow duct 12 into the bypass duct 18 can be configured in the open position of the inlet flap 24, as shown. A flow 30 along the main flow direction 28 can be diverted by a flow jet 32 that leaves the bypass duct 18 at an angle with respect to the main flow direction 28 to create a diverted flow 34 that can leave the outlet opening 16 into a passenger interior of the motor vehicle.

Figure 2:
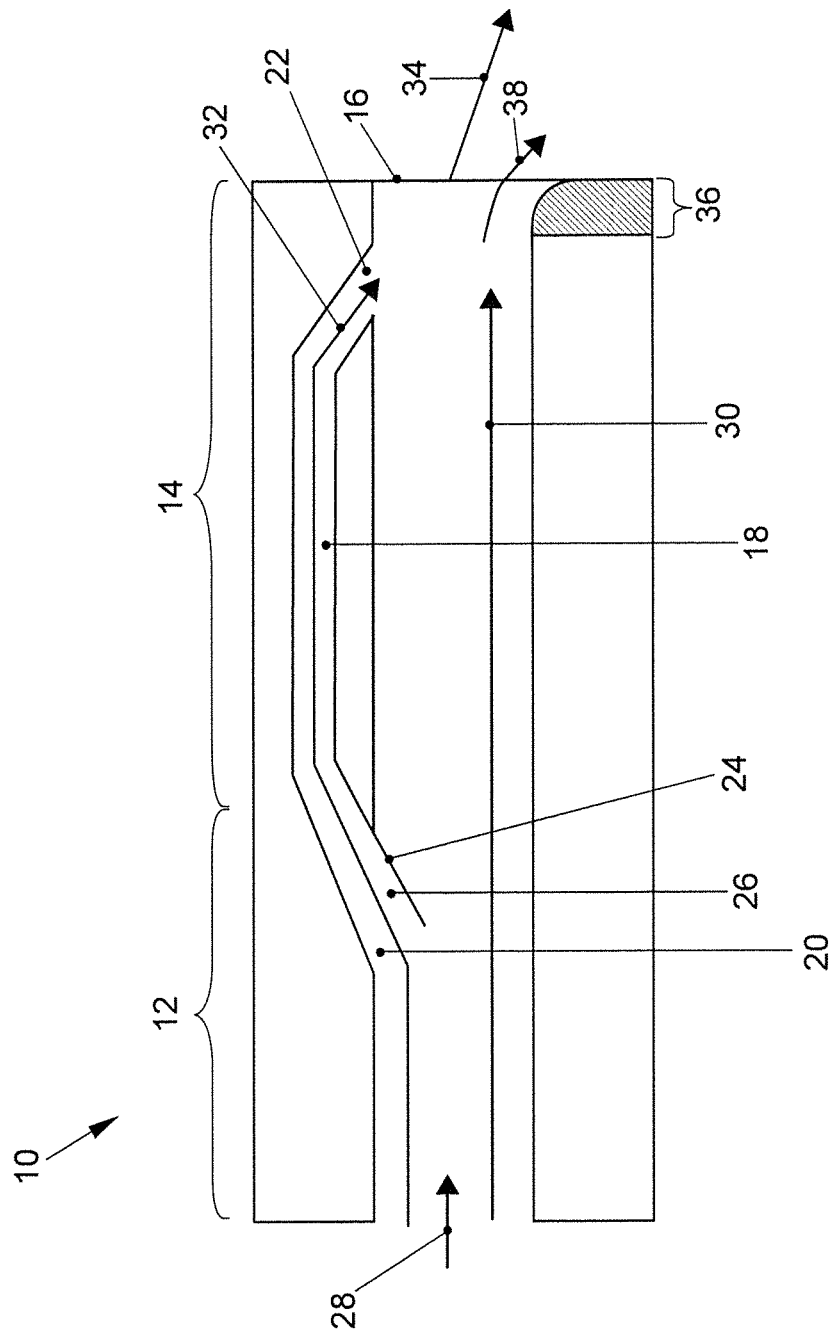
FIG. 2 is a diagrammatic sectional view of a second embodiment of a ventilation duct.

The main guiding duct 14 of ventilation duct 10 in the embodiment of FIG. 2 differs from FIG. 1 by having a convexly rounded end region 36 on the side opposite the bypass duct 18. As a result, a part flow 38 of the flow 30 of the main guiding duct 14 can be diverted by the Coanda effect in addition to the diversion by the flow jet 32, in a comparable direction to the diverted flow 34.

Figure 3:
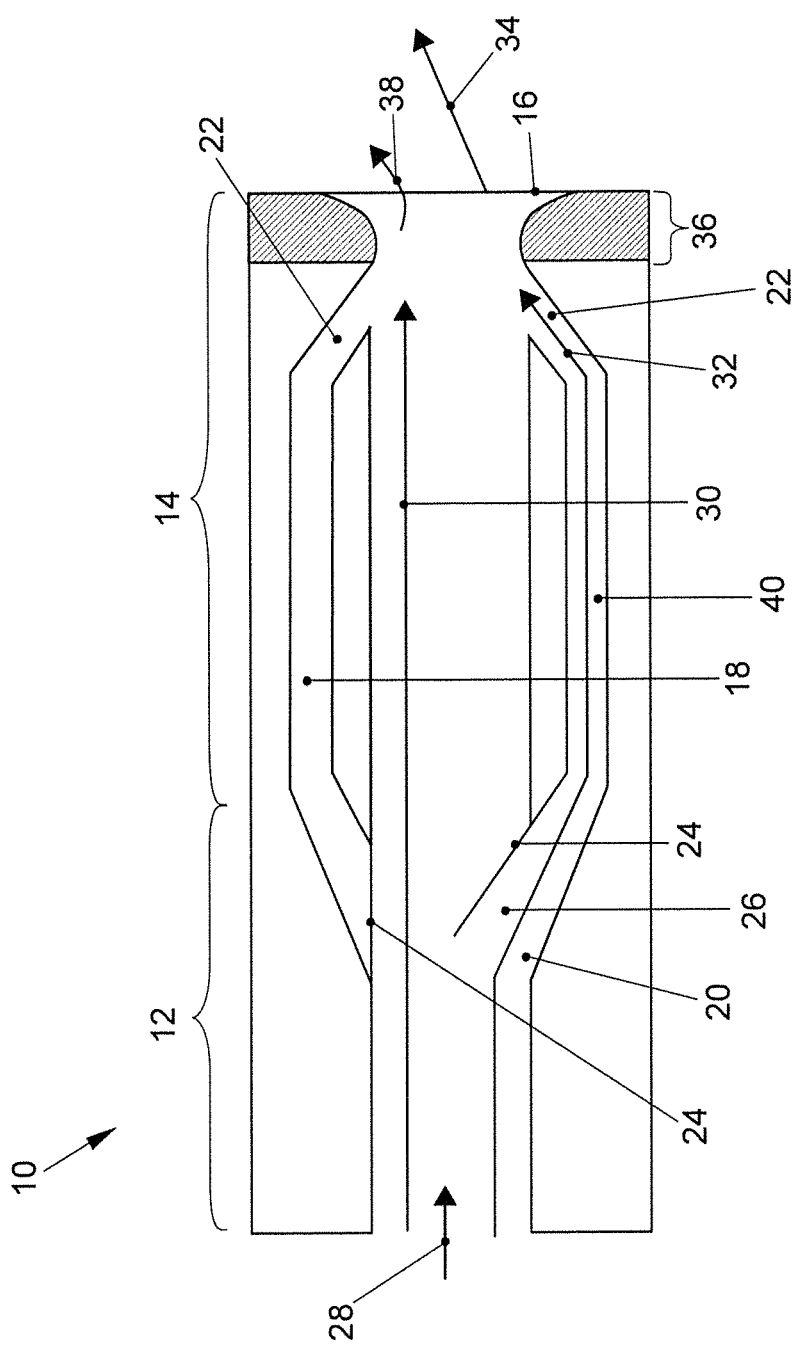
FIG. 3 is a diagrammatic sectional view of a third embodiment of a ventilation duct.

The embodiment of the ventilation duct 10 shown in FIG. 3 differs from the embodiment of FIG. 2 by providing a second bypass duct 40 opposed in a mirror-symmetrical manner to the first bypass duct 18. As a result, the flow 30 of the main guiding duct 14 can be diverted in another direction. The end region 36 of the main guiding duct also is rounded convexly at a position opposite the second bypass duct 40 to achieve a part flow 38 that is diverted by the Coanda effect.

Figure 4:
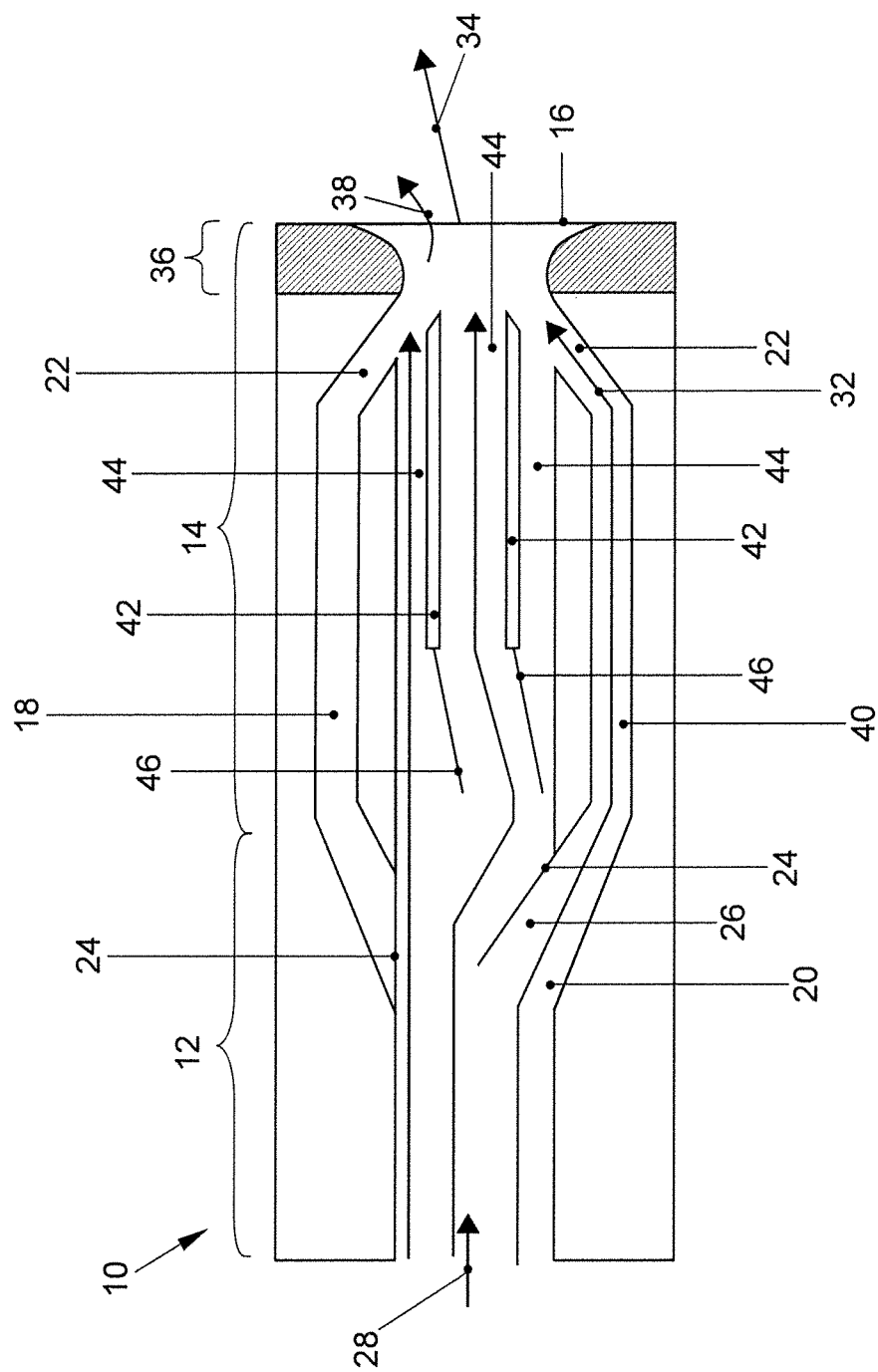
FIG. 4 is a diagrammatic sectional view of a fourth embodiment of a ventilation duct.

The embodiment of the ventilation duct 10 shown in FIG. 4 differs from the embodiment of FIG. 3 by providing dividing walls 42 in the main guiding duct 14 to divide the main guiding duct 14 into a plurality of part ducts 44. A guiding flap 46 is provided on the end of each dividing wall 42 that points toward the inflow duct 12. A part duct 44 that points away from the activated second bypass duct 40 can be opened by the guiding flap 46 and a part duct 44 that runs adjacent to the activated second bypass duct 40 can be closed. This ensures that the part flow 38 that is diverted by the Coanda effect occurs only on the side of the main guiding duct 14 that points away from the activated second bypass duct 40. The main flow direction 28 can be maintained in the middle part duct 44.

Figure 5:
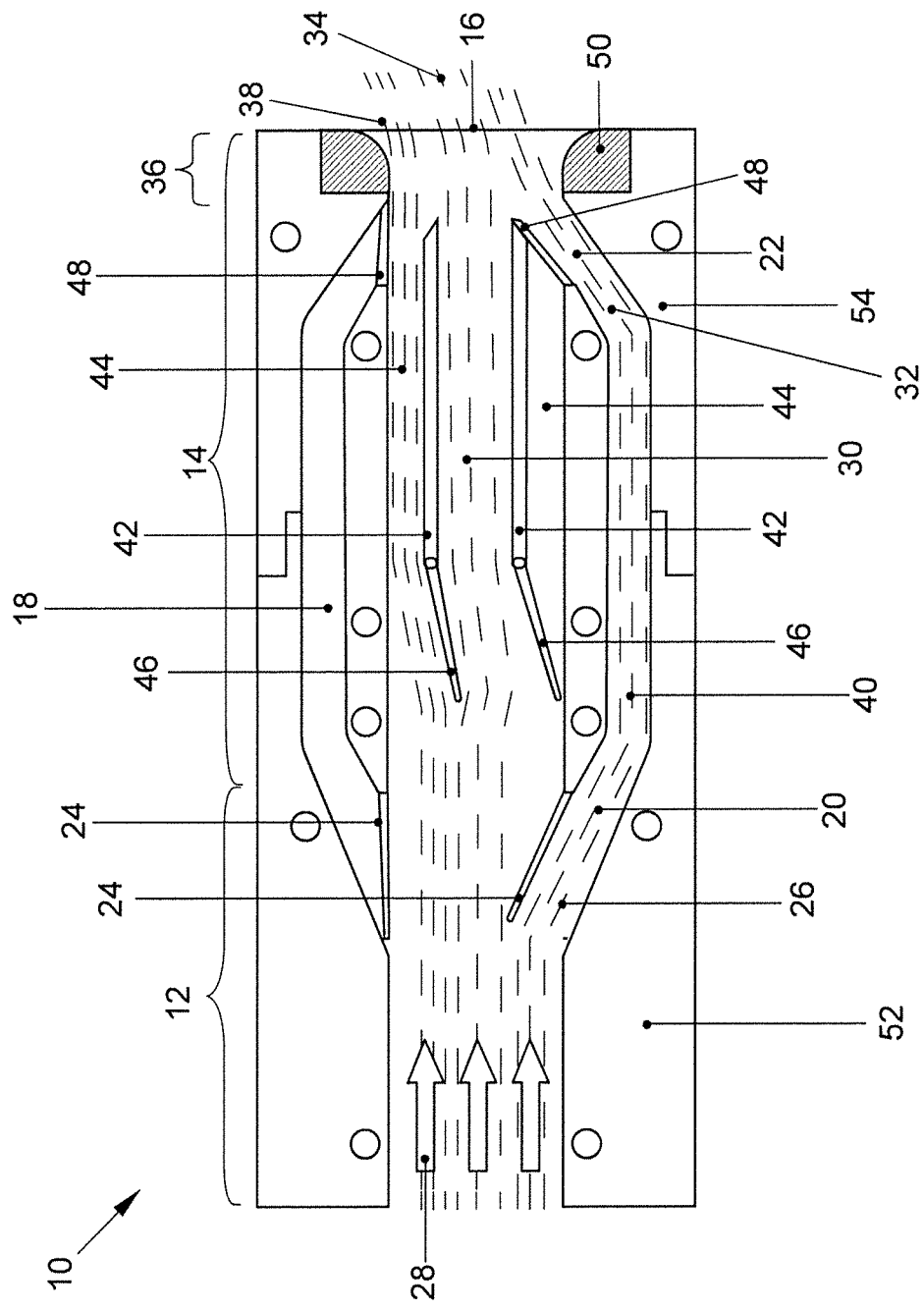
FIG. 5 is a detailed diagrammatic sectional view of a fifth embodiment of a ventilation duct.

The embodiment of the ventilation duct 10 shown in FIG. 5 differs from the embodiment of FIG. 4 by providing the outlet opening 22 of each bypass duct 18, 40 with an outlet flap 48 that can closed to close the respective bypass duct 18, 40. In the open position of the respective outlet flap 48, the adjacent part duct 44 can be closed by the outlet flap 48. As a result, the guiding flaps 46 can be dispensed with. The rounded end regions 36 of the main guiding duct 14 can be configured by an insert 50 that is inserted into the material of the main guiding duct 14. The insert 50 can be adapted in terms of color, for example, to an instrument panel of the motor vehicle so that the visual appearance can be improved and an adaptation to different designs can be carried out by an exchange of the insert 50. Furthermore, it is possible to assemble the ventilation duct 10 from a first component 52 and a second component 54. The first component 52 can form the inflow duct 12 and part of the main guiding duct 14 and possibly part of the bypass ducts 18, 40 and/or the inlet flaps 24. The second component 54 can form the other part of the main guiding duct 14 and possibly part of the bypass ducts 18, 40 and/or the outlet flaps 48 and/or the dividing walls 42 and/or the guiding flaps 46

What is claimed is:

1. A ventilation duct for ventilating a passenger interior of a motor vehicle, comprising:
   an inflow duct for supplying air;
   a main guiding duct formed by main guiding duct walls extending from the inflow duct to an outlet opening for guiding at least part of the air of the inflow duct along a main flow direction toward the outlet opening;
   first and second opposed bypass ducts formed by bypass duct walls that branch off from the inflow duct for receiving part of the air of the inflow duct, each of the bypass ducts having a downstream end opening into the main guiding duct upstream of the outlet opening for introducing a flow jet into the main guiding duct at an acute angle to the main flow direction and inward toward a center of the outlet opening, first and second convexly curved surfaces extending continuously from the downstream ends of the respective first and second bypass ducts to the outlet opening of the main guiding duct for generating a Coanda effect at the outlet opening, each of the bypass ducts further having an upstream end and a funnel-shaped inflow region leading into the respective bypass duct, each of the funnel-shaped inflow regions tapering to smaller cross-sectional areas at positions farther downstream to accelerate the air that is branched off into the bypass ducts, first and second inlet flaps for selectively and independently opening and closing the respective first and second bypass ducts for generating controlled directional changes of air leaving the outlet opening, the inlet flaps that are in the open position protrude into the inflow duct to define funnel-shaped extensions of the inflow regions of the bypass ducts with larger cross-sectional areas at more upstream positions, and first and second outlet flaps at downstream ends of the first and second bypass ducts respectively for selectively opening and closing the downstream ends of the first and second bypass ducts, the first outlet flap being opened when the first inlet flap is opened and being closed when the first inlet flap is closed, the second outlet flap being opened when the second inlet flap is opened and being closed when the second inlet flap is closed so that the downstream ends of the bypass ducts do not affect airflow in proximity to the outlet opening when there is no airflow through the respective bypass duct; and
   at least one dividing wall in the main guiding duct at least at one position spaced inward from any of the bypass duct walls that define the bypass ducts for dividing the main guiding duct into at least two part ducts, and a guiding flap at an end of the dividing wall that points toward the inflow duct for setting different flow velocity in the pasrt ducts.

2. The ventilation duct of claim 1, further comprising an outlet flap at a downstream end of the bypass duct for selectively closing or opening the bypass duct, the outlet flap being substantially aligned with one of the main guiding duct walls of the main guiding duct when the outlet flap is in a position for closing the bypass duct.

3. The ventilation duct of claim 2, wherein the outlet flap closes a radially outer part duct in the open position.

4. The ventilation duct of claim 1, wherein the acute angle between the flow jet and the main flow direction is between 15° and 30°.

5. The ventilation duct of claim 4, wherein the acute angle between the flow jet and the main flow direction is between 20° and 25°.

6. A ventilation duct for ventilating a passenger interior of a motor vehicle, comprising:
   an inflow duct for supplying air;
   a main guiding duct formed by main guiding duct walls extending from the inflow duct to an outlet opening for guiding at least part of the air of the inflow duct along a main flow direction toward the outlet opening;
   at least one dividing wall spaced inward from the main guiding duct walls that form the main guiding duct such that the at least one dividing wall divides the main guiding duct into at least two part ducts;
   at least one guiding flap at an upstream end of the dividing wall, the at least one guiding flap being movable for at least partly closing at least one of the part ducts and thereby setting different flow velocities in the part ducts;
   first and second bypass ducts formed by walls spaced outward from the at least one dividing wall, funnel-shaped upstream inlets that branch off from opposed positions in the inflow duct for receiving part of the air of the inflow duct, the funnel-shaped inlets tapering to smaller cross-sectional areas at positions farther downstream to accelerate the air that is branched off into the bypass ducts, the bypass ducts having opposed downstream ends opening into the main guiding duct upstream of the outlet opening for introducing a flow jet into the main guiding duct at an acute angle to the main flow direction and inward toward a center of the outlet opening;

first and second inlet flaps at the upstream ends of the first and second bypass ducts, each of the inlet flaps being selectively and independently movable between a closed position where the respective flap is substantially flush with the inflow duct and closes the respective bypass duct and an open position where the flap protrudes into the inflow duct to guide air into the bypass duct;

first and second outlet flaps at downstream ends of the first and second bypass ducts respectively for selectively opening and closing the downstream ends of the first and second bypass ducts, the first outlet flap being opened when the first inlet flap is opened and being closed when the first inlet flap is closed, the second outlet flap being opened when the second inlet flap is opened and being closed when the second inlet flap is closed so that the downstream ends of the bypass ducts do not affect airflow in proximity to the outlet opening when there is no airflow through the respective bypass duct; and first and second convexly curved surfaces extending continuously from the downstream ends of the respective first and second bypass ducts to the outlet opening of the main guiding duct for generating a Coanda effect at the outlet opening.

7. The ventilation duct of claim 6, wherein the acute angle between the flow jet and the main flow direction is between 15° and 30°.

8. The ventilation duct of claim 7, wherein the acute angle between the flow jet and the main flow direction is between 20° and 25°.

9. The ventilation duct of claim 6 wherein areas of the main guiding duct upstream of the downstream ends of the first and second bypass ducts define a specified cross-sectional shape along the main flow direction, and wherein no part of main guiding duct downstream of the first and second bypass ducts protrudes inward relative to the specified cross-sectional shape of the main guiding duct.

10. The ventilation duct of claim 1, wherein areas of the main guiding duct upstream of the downstream ends of the first and second bypass ducts define a specified cross-sectional shape along the main flow direction, and wherein no part of the main guiding duct downstream of the first and second bypass ducts protrudes inward relative to the specified cross-sectional shape of the main guiding duct.

* * * * *